Figure 1:
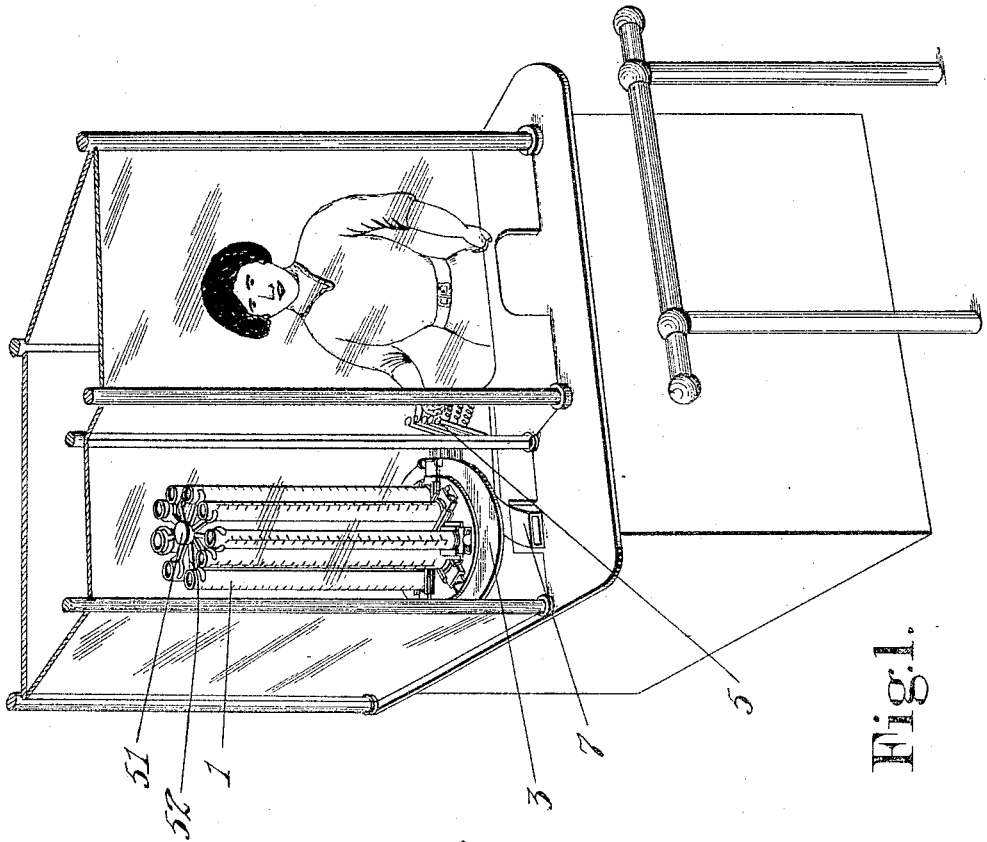

H. H. GOVE & A. MERLIN.
APPARATUS FOR USING INDESTRUCTIBLE CHECKS.
APPLICATION FILED JULY 5, 1913.

1,197,577.

Patented Sept. 5, 1916.
3 SHEETS—SHEET 1.

WITNESSES.
H. W. Kenway.
Martha W. Coupe.

INVENTORS.
Henry H. Gove
Albert Merlin
by Fred W Guibord
Atty

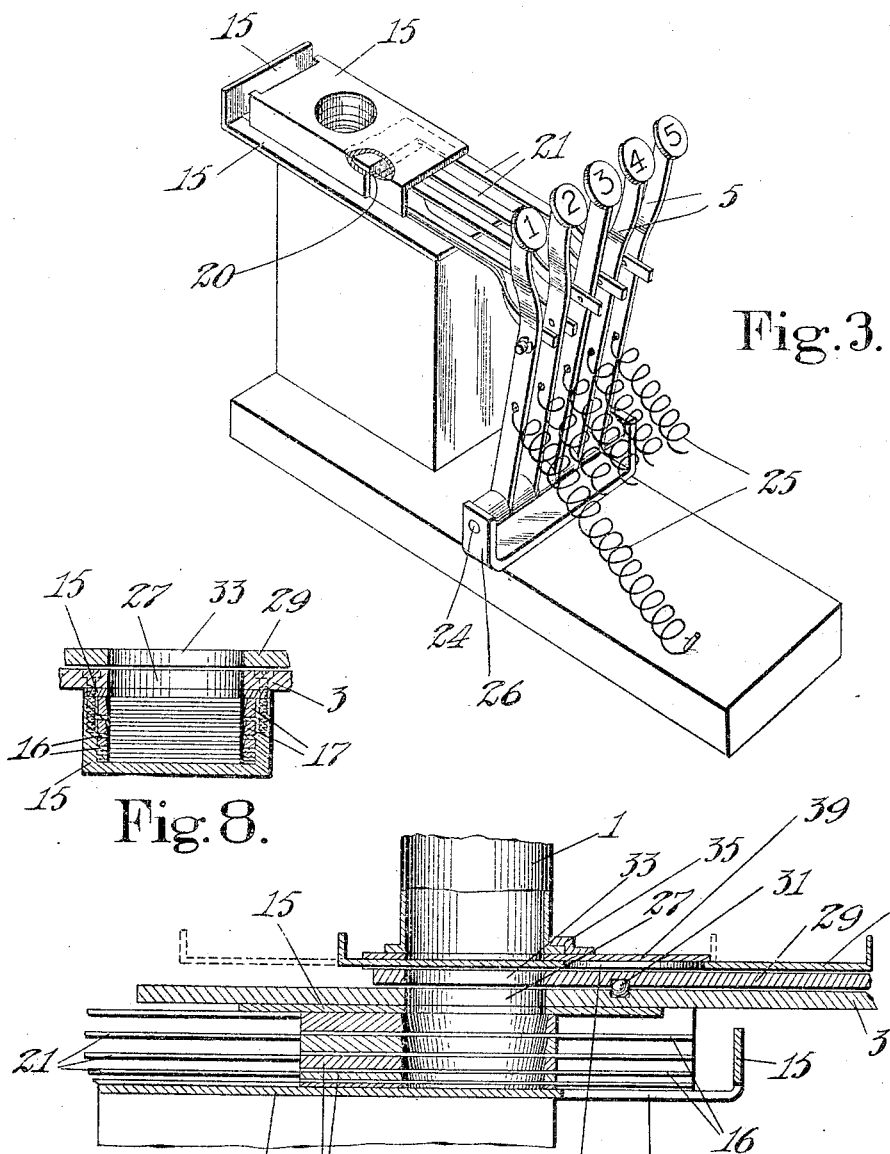

H. H. GOVE & A. MERLIN.
APPARATUS FOR USING INDESTRUCTIBLE CHECKS.
APPLICATION FILED JULY 5, 1913.

1,197,577.

Patented Sept. 5, 1916.
3 SHEETS—SHEET 3.

WITNESSES.

INVENTORS.

UNITED STATES PATENT OFFICE.

HENRY H. GOVE AND ALBERT MERLIN, OF BIDDEFORD, MAINE, ASSIGNORS, BY DIRECT AND MESNE ASSIGNMENTS, OF ONE-FIFTH TO JOHN W. MAHONEY AND TWO-FIFTHS TO WILBUR S. CLEAVES, BOTH OF BIDDEFORD, MAINE.

APPARATUS FOR USING INDESTRUCTIBLE CHECKS.

1,197,577.  Specification of Letters Patent.  Patented Sept. 5, 1916.

Application filed July 5, 1913. Serial No. 777,580.

*To all whom it may concern:*

Be it known that we, HENRY H. GOVE and ALBERT MERLIN, citizens of the United States, residing at Biddeford, in the county of York and State of Maine, have invented certain Improvements in Apparatus for Using Indestructible Checks, of which the following description, in connection with the accompanying drawings, is a specification, like reference characters on the drawings indicating like parts in the several figures.

This invention relates to an apparatus for making use of indestructible checks and is herein illustrated in connection with the selling and taking of tickets, checks or tokens at the entrance of a theater.

Hitherto it has been customary to make use of printed tickets which are commonly supplied in the form of a roll and torn off as sold, such tickets being used but once and being destroyed after each performance. This procedure entails a very considerable expense, affords opportunity for the reselling of used tickets, and does not furnish a readily accessible record of the tickets sold and of those taken.

The present invention provides an apparatus in which the tickets are in the form of checks made of metal or other practically indestructible material, and the number of checks sold as well as those taken can be learned at any time by mere inspection of the apparatus. Moreover the check vender has no access to the checks to be sold except through an ejecting mechanism whereby a selected number of checks are delivered to a purchaser; and the sold checks, after having been deposited by a purchaser upon a receiving casing, are automatically stacked up in readiness to be sold again, so that there is no necessity for handling the checks at all after the apparatus has once been supplied. These and other features of the invention including certain details of construction and combinations of parts will be described in connection with an illustrative apparatus and pointed out in the appended claims.

Figure 2:
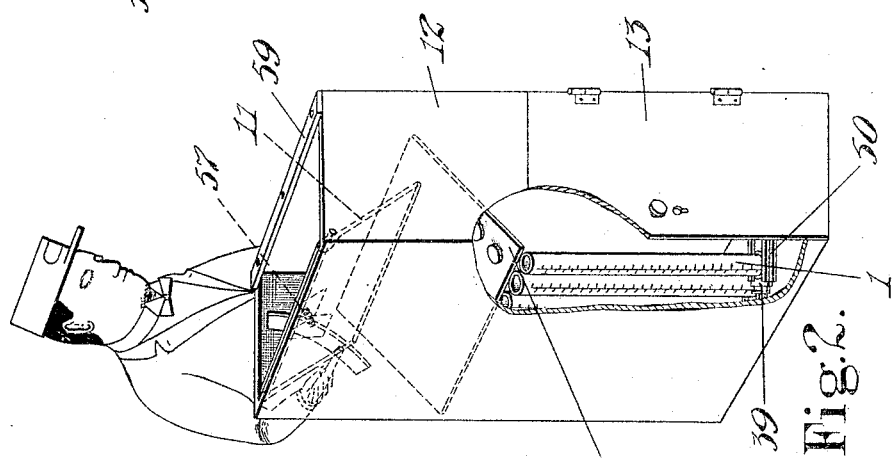
Figure 5:
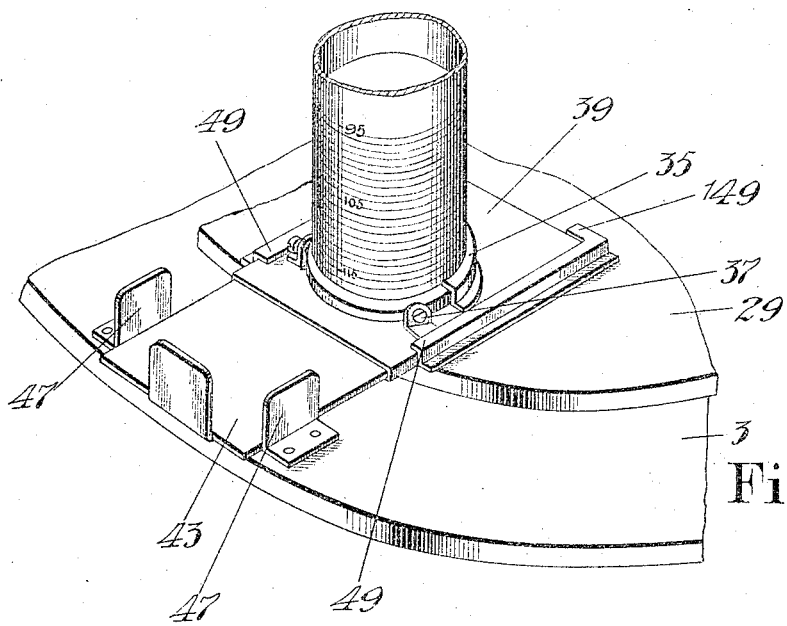
Figure 6:
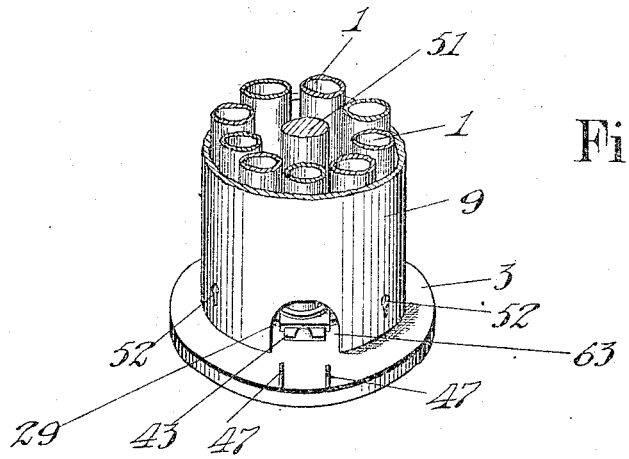
Figure 7:
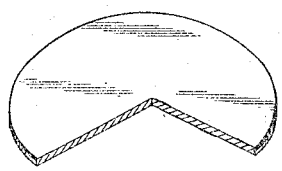

Referring now to the accompanying drawings, the apparatus as a whole is illustrated in Figures 1 and 2. Fig. 1 is a perspective of a check vender's booth showing the check vending mechanism in place, the cover for the magazines having been removed to promote clearness. Fig. 2 is a perspective of the check taker's receiving casing. Fig. 3 is a perspective of the check ejecting mechanism. Fig. 4 is a section of the check vending mechanism showing the relation of the ejecting mechanism to one of the magazines which hold the unsold checks. Fig. 5 is a fragmentary perspective showing the mounting of one of the magazines. Fig. 6 is a perspective showing more particularly the cover for the magazines. Fig. 7 is a perspective of one of the checks. Fig. 8 is a section through the ejecting mechanism and the supports for the magazines.

Referring first more particularly to Figs. 1 and 2, the general operation of the apparatus will first be described. The checks to be sold are held in the tubes or magazines 1 in the check vender's booth, being rotatable as a whole upon a stationary base 3 so as to bring any desired magazine into register with an ejecting mechanism, the keys of which are indicated at 5, by which a selected number of checks may be ejected through a chute 7 into position to be picked up by a purchaser. In use a cover, presently to be described, is locked down over the magazines so that the only access which the vender has to the checks is through the ejecting mechanism. It should be particularly noted that the chute 7 delivers the checks into a position inaccessible to the check vender. The checks thus delivered to a purchaser are surrendered to a check taker but not in the usual manner. Instead the purchaser drops the checks upon the cover 11 of a receiving casing 12. This cover is normally held in a horizontal position but may be swung to permit the checks to slide down an inclined plate into magazines which are held in the lower part of the receiving casing as shown in Fig. 2. All of the magazines used in the apparatus are identical in shape and size so that when those in the check vender's booth have been emptied and those in the casing 12 filled an exchange may be made, it being understood that the combined capacity of the magazines is sufficient to contain twice the number of checks used. The magazines shown are made of glass and provided with graduations so that an inspection of them at any time will indicate the number of checks which have been sold and taken. Access to the magazines in the casing 12 may be had by unlocking and opening a door 13; and similarly access to the magazines in the check vender's booth may be had by unlocking and removing a cover 9 (see Fig. 6). The keys to the cover and to the door may be kept in the possession of the owner or some official of the theater by whom the exchange of magazines may be made. Thus the checks are at no time handled either by the check vender or by the check taker; and an instantly available record of checks sold and checks received is afforded.

Referring now more particularly to Figs. 3, 4 and 8, the ejecting mechanism will be described. A casing 15, which may be made of several plates fastened together by any suitable means, is located beneath the base 3 and is preferably fastened thereto. This casing is provided on its interior side walls with shelves or ledges 16 upon which rest the feed slides or carriers 17 having holes which are normally in register in the position shown; but the carriers may be moved forward either together or separately so as to bring the holes or sockets into register with a hole 19 in the lower wall of the casing 15. If now a pile of superposed checks extends through the holes in the carriers 17 and rests at its bottom upon the lower wall of the casing 15, it will be clear that forward movement of any given carrier will cause a number of the checks to be carried forward and dropped through the hole 19. The inclined chute 7 (see Fig. 1) has its upper end located beneath this hole 19, so that the checks which fall through said hole are delivered into a position inaccessible to the vender.

In order to permit selection and control of the number of checks delivered, the feed slides or carriers 17 are made of different thicknesses. In the illustrative apparatus the thickness of the upper carrier plus that of the ledge 16 upon which it rests is equal approximately to the thickness of five checks, and the thickness of the next lower carrier plus that of its supporting ledge is equal approximately to the thickness of four checks, so that movement of these two carriers together will eject nine checks, while movement of one of them will eject either five or four checks according to which carrier is moved. The next two lower carriers are similarly adapted to eject three and two checks respectively, while the lowest carrier is adapted to eject one check. The holes in the carriers are made slightly flaring or conical whereby the checks drop more readily from one into another.

Backward movement of the carriers is limited by the shoulder 20 of the casing 15 against which they are normally held by springs 25, the holes in the carriers being then in register with each other and with certain other holes and passages presently to be described. Forward movement of the carrier is produced by pressing upon the keys 5 which are pivotally connected with the carriers by small rods 21. The keys themselves are pivoted at 24 to a stationary bracket 26 and are normally held in retracted position by the springs 25. Forward movement of the carriers is limited by a stop herein shown as an upturned end of the lower wall of the casing 15.

The stationary base 3 is provided with a hole or passage 27 which registers at all times with the similar hole or passage in the upper wall of the casing 15; and rotatably mounted upon this base 3 is a support 29 for the magazines 1, a raceway and balls (one of which is shown at 31) being provided to facilitate this rotation. The support 29 is provided with as many holes or passages 33 as there are magazines to be supported; and over each hole or passage a magazine 1 is mounted. Each magazine has an enlarged base portion which is secured by a collar 35 and set-screws 37 to a plate 39 to which the collar and the lugs which carry the set-screws are fast. This plate 39 has a hole which registers with the bore of the magazine 1, is held in place by resilient members 49 fast to the support 29, and has depending inturned side flanges which serve as guides for a slide 43 the purpose of which is to open and close the bottom of the magazine. In Fig. 4 the slide 43 is shown in full lines in closed position (the hole 45 in said slide being then out of register with the bore of the magazine), and in dotted lines in open position. The plate 39 is properly located by means of stops 149 on the spring members 49; and the angular position of the support 29 with respect to the base 3 is determined by guides 47 between which the slide 43 is adapted to be pulled out as shown in Fig. 5. With this construction, each magazine with its plate 39 and slide 43 forms a unitary structure which may be removed when it is desired to replace the empty magazine by filled ones; and in the bottom of the receptacle 12 are located guides 50 which are adapted to hold the plates 39 (and hence the magazines 1) while said magazines are in position to be filled.

In order to steady the magazines 1 when they are in place upon the support 29, a rod 51 (see Figs. 1 and 6) is mounted in the center of the support 29 and carries at its upper end spring clips 52 which embrace the upper ends of the magazines. The support is rotatable about the axis of said rod 51.

Referring now to Fig. 6 a cover 9, which may be in the form of a hollow cylinder open at one end, is adapted to be locked to the base 3 by means of a key inserted in the key holes 52. This cover has an opening 63 of sufficient size to permit the check vender to reach in and turn the support 29 after one magazine has been emptied so as to bring a filled magazine into place.

Supposing the apparatus is to be used in connection with a place of amusement such as a moving picture theater, the proprietor, manager or other official first fills the proper number of magazines, places them in position in the vender's booth, puts on the cover 9 and locks it in place. He then puts the remaining empty magazines in place in the receiver 12 and locks the door 13. The vender then proceeds to take in entrance fees and to deliver the proper number of checks through the chute 7 by means of the ejecting mechanism. When one magazine has been emptied she pushes in the slide 43 thereby closing the bottom of the empty magazine and rotates the support 29 to bring a second filled magazine into proper position, after which she pulls out the slide 43 of said second magazine thereby permitting the stack of checks to settle into the carriers of the ejecting mechanism. She thus has no means of reaching the checks, although she can deliver as many of them as she pleases to a purchaser. Each purchaser picks up the checks which he has bought and drops them upon the plate 11 of the receiving casing, said plate being normally held up against a stop 59 by a spring 57, whereupon the check taker counts them at a glance and then swings the plate 11 into the position shown in Fig. 2. The checks fall upon the inclined plate 61 and slide into one or another of the magazines 1. At the end of the performance in the theater, the owner or other official first unlocks the door 13 and determines the number of checks which have been received, and then unlocks the cover 9 and learns whether the number received corresponds to the number sold. He then replaces the empty magazines in the vender's booth by filled magazines taken from the receiving casing, and the apparatus is ready to be used again.

Although the invention has been set forth in connection with a particular apparatus adapted for a particular use, it should be understood that the invention is not limited either to the particular use or to the particular apparatus.

Having thus described the invention, what we claim and desire to secure by Letters Patent of the United States is:

1. An apparatus of the kind described, having a plurality of interchangeable magazines to dispense indestructible checks and adapted to collect said checks when so dispensed, a check dispensing rotatable support into which each filled magazine is arranged to fit, a base for said support, there being a check receiving passage in said base and a similar passage in the rotatable support directly under each magazine, a slide for opening and closing said magazine, and ejecting mechanism located to receive checks from the magazine through the passage in the base, said magazine when emptied being adapted to be removed from the support and utilized as a check collecting receptacle.

2. An apparatus of the kind described, having a plurality of interchangeable magazines to dispense indestructible checks and adapted to collect said checks when so dispensed, a dispensing rotatable support capable of receiving a plurality of filled interchangeable magazines into which support all of said magazines are adapted, when filled, to fit, said support having a passage therethrough coöperating with each filled magazine to dispense therefrom a selective number of said checks, means on said dispensing apparatus to coöperate with the magazines to aline the same thereon, each magazine, when emptied, being adapted to be removed from the support and utilized as a check collecting receptacle, which collecting renders said magazine again adaptable to fit into said dispensing support.

3. In an apparatus of the class described, a base having a passage for checks, a support rotatably mounted thereon and having a plurality of similar passages, a magazine located above each passage in the rotatable support, a slide for opening and closing the magazine, a guide on said base arranged to coöperate with said slide in properly locating the open magazine, and an ejecting mechanism located to receive checks through the passage in the base.

4. In an apparatus of the class described, a check ejecting mechanism for ejecting from a pile of superposed checks a selected number comprising a plurality of carriers of different thickness, arranged in superposed relation, each carrier being movable with respect to the other to eject a number of checks dependent upon the thickness of said carrier, and means for operating any selected carrier.

5. In an apparatus of the class described a check ejecting mechanism for ejecting a check ejecting mechanism for ejecting from a pile of superposed checks a selected number comprising a plurality of rings of different thickness, arranged in superposed relation, each ring being movable with respect to the others to eject a number of checks dependent upon its thickness, and means for operating any selected ring.

6. In an apparatus of the class described an ejecting mechanism for ejecting the desired number of checks from the lower part of a pile comprising a plurality of superposed carriers of different thickness, the openings through which are tapering, and means for operating any selected carrier or combination of carriers to eject a predetermined number of checks.

7. In an apparatus of the class described a base having a passage therein, a rotatable support mounted thereon and having a plurality of passages arranged to be brought successively into register with the passage in the base, a pair of guides on each side of each passage in the support, a plate adapted to fit between said guides, said plate having a passage to register with the passage in the support and being provided with a guideway a slide located in said guideway and having a passage therein adapted, when said slide is moved from one extreme position to the other to be brought into and out of register with the passage in said plate, and a magazine mounted on said plate.

8. In an apparatus of the class described, a base having a passage for checks, a support rotatably mounted thereon and having a plurality of passages adapted to be brought selectively into register with the passage in the base, a magazine located above each passage in the rotatable support, a cover for the open upper ends of said magazines, means for locking said cover in place, and an ejecting mechanism located to receive checks through the passage in said base, said mechanism comprising a plurality of carriers and means for selectively operating any carrier or combination of carriers.

9. A check ejecting mechanism comprising a plurality of carriers, located one above another and having operating faces which register, whereby a column of superposed checks may stand in position to have checks ejected from the bottom and from intermediate portions of said column, guides upon which said carriers are slidable, and means for operating said carriers, said carriers being of different thickness, and each carrier being of a thickness less than that of the number of checks which it is designed to eject, whereby checks which vary slightly in thickness may be readily ejected.

In testimony whereof we have signed our names to this specification in the presence of two subscribing witnesses.

HENRY H. GOVE.
ALBERT MERLIN.

Witnesses to the signature of Henry H. Gove:
F. P. HARRIS,
LEROY HALEY.

Witnesses to the signature of Albert Merlin:
THOMAS H. RUSTON,
EDWARD F. RYAN.

Copies of this patent may be obtained for five cents each, by addressing the "Commissioner of Patents, Washington, D. C."